(12) United States Patent
Nagami

(10) Patent No.: US 8,552,433 B2
(45) Date of Patent: Oct. 8, 2013

(54) DISPLAY DEVICE

(75) Inventor: Takahiro Nagami, Mobara (JP)

(73) Assignee: Japan Display East Inc., Mobara-shi, Chiba (JP)

( * ) Notice: Subject to any disclaimer, the term of this patent is extended or adjusted under 35 U.S.C. 154(b) by 0 days.

(21) Appl. No.: 13/490,763

(22) Filed: Jun. 7, 2012

(65) Prior Publication Data

US 2013/0020579 A1     Jan. 24, 2013

(30) Foreign Application Priority Data

Jul. 21, 2011 (JP) ................... 2011-159796

(51) Int. Cl.
*H01L 27/14* (2006.01)
*H01L 29/04* (2006.01)
*H01L 29/15* (2006.01)
*H01L 31/036* (2006.01)
*G02F 1/1333* (2006.01)
*G02F 1/1337* (2006.01)

(52) U.S. Cl.
USPC ............. 257/72; 349/122; 349/123; 349/128; 349/141

(58) Field of Classification Search
USPC ............ 257/66–103; 438/22–47; 349/56–166
See application file for complete search history.

(56) References Cited

U.S. PATENT DOCUMENTS

| 6,172,733 | B1* | 1/2001 | Hong et al. | 349/152 |
| 7,426,004 | B2* | 9/2008 | Hu et al. | 349/114 |
| 2003/0086046 | A1* | 5/2003 | You | 349/149 |
| 2005/0286003 | A1* | 12/2005 | Lee et al. | 349/141 |
| 2012/0241750 | A1* | 9/2012 | Chikama et al. | 257/71 |

FOREIGN PATENT DOCUMENTS

JP     2010049185     3/2010

\* cited by examiner

*Primary Examiner* — Fernando L Toledo
*Assistant Examiner* — Karen Kusumakar
(74) *Attorney, Agent, or Firm* — Ulmer & Berne LLP

(57) ABSTRACT

A display device which can suppress waveform distortion and lowered transmission coefficient of pixels, and suppress display irregularity is provided. In a display device having pixels arranged in a delta arrangement, a pixel includes a pixel portion which comprises a TFT including a source electrode, a drain electrode and a gate electrode, a common electrode and a pixel electrode, an organic passivation film has asymmetrical opening portions above a contact portion of the source electrode, and the orientations of the asymmetrical opening portions in the organic passivation films of pixels adjacent to each other are the same.

6 Claims, 14 Drawing Sheets

DISPLAY DEVICE

CLAIM OF PRIORITY

The present application claims priority from Japanese Patent Application JP 2011-159796 filed on Jul. 21, 2011, the content of which is hereby incorporated by reference into this application.

BACKGROUND OF THE INVENTION

1. Field of the Invention

The present invention relates to a double speed drive display device with increased number of scanning lines and reduced number of video signal lines.

2. Description of the Related Art

In a display device, a TFT substrate on which pixels are formed in a matrix pattern having pixel electrodes thin film transistors (TFT) and other components, and a counter substrate opposing the TFT substrate having color filters and other components formed thereon in portions corresponding to those of pixel electrodes of the TFT substrate are disposed. In a liquid crystal display device, liquid crystals are placed between the TFT substrate and counter substrate. An image is formed by controlling the transmission coefficient of light by liquid crystal molecules for each pixel.

OLED display devices and MEMS display devices typically including liquid crystal display devices are increasingly used in various fields since they are flat and light-weighted. In cellular phones, DSCs (Digital Still Cameras) and like devices, small-sized liquid crystal display devices are widely used. There is the issue of viewing angle characteristics in liquid crystal display devices. The viewing angle characteristic is the phenomenon that luminance and chromaticity vary when a screen is seen from the front and at an angle. As for the viewing angle characteristic, the IPS (In Plane Switching) method which operates liquid crystal molecules by an electric field (horizontal electric field) in the horizontal direction has excellent properties (for example, Japanese Patent Application Laid-Open Publication No. 2010-49185).

SUMMARY OF THE INVENTION

Display devices for digital cameras and the like are having increasingly higher densities, integration and resolution of pixels. As one direction of such a trend, the inventors of the present invention arranged pixels in a delta arrangement, that is, in a matrix pattern, and had pixels which are adjacent vertically along drain signal lines (video signal lines) shifted from each other by the pitch of ½ pixel in the direction of extension of gate signal lines (scanning lines). Furthermore, such a constitution that has a single drain signal line for two gate signal lines is employed from the perspective Of layout of wiring in a frame and the number of terminals of drivers. However, when this constitution is used, it was expected that the following problems occur: since there are two gate signal lines per pixel, the transmission coefficient of pixels is lowered, and writing time is reduced by one half since there is only a single drain signal line and thus the drive frequency is doubled, so that insufficient writing is expected occurs due to the waveform distortion of the drain line. Therefore, it was found that the insufficient writing was likely to be suppressed and prevented by laminating an organic passivation film in addition to the inorganic passivation film lying between the drain line and common line to lower the line capacity, while the lowered transmission coefficient of pixels was likely to be suppressed and prevented by changing the design margin of source contact portions of pixels from four-side contact design to two-side contact design so that the area of the contact portions is reduced and the area of pixels is increased.

However, when the above measure was taken in producing a display device, it was found that the problem of display irregularity occurred.

An object of the present invention is to provide a display device having pixels disposed in the above-mentioned constitution, which can suppress waveform distortion and lowered transmission coefficient of pixels, and suppress display irregularity.

As an embodiment for achieving the above object, provided is a display device including a display area including a plurality of pixels, and a driver which provides a signal for indicating an image in the display area, each of the plurality of pixels which includes a common electrode, a pixel electrode and a TFT including a source electrode, a drain electrode and a gate electrode, the common electrode and the pixel electrode being disposed on a multilayer film including an inorganic passivation film and an organic passivation film disposed above the source electrode of the TFT, the organic passivation film having an asymmetrical opening portion above a contact portion of the source electrode, a through hole disposed above the contact portion of the source electrode and inside the opening portion of the organic passivation film being provided in the multilayer film including the inorganic passivation film and the above inorganic passivation film, the source electrode and the pixel electrode being electrically connected via the through hole, and the orientations of the asymmetrical opening portions of the organic passivation films of the pixels adjacent to each other and to which the drain electrode of the TFT is connected and being the same.

According to the present invention, by forming a passivation film with a multilayer structure including an inorganic passivation film, an organic passivation film and an upper inorganic passivation film, and matching the orientations of asymmetrical opening portions in the organic passivation film of pixels adjacent to each other, it is possible to provide a display device which can suppress waveform distortion and lowered transmission coefficient of pixels, and suppress display irregularity.

DESCRIPTION OF THE PREFERRED EMBODIMENT

Figure 4A:
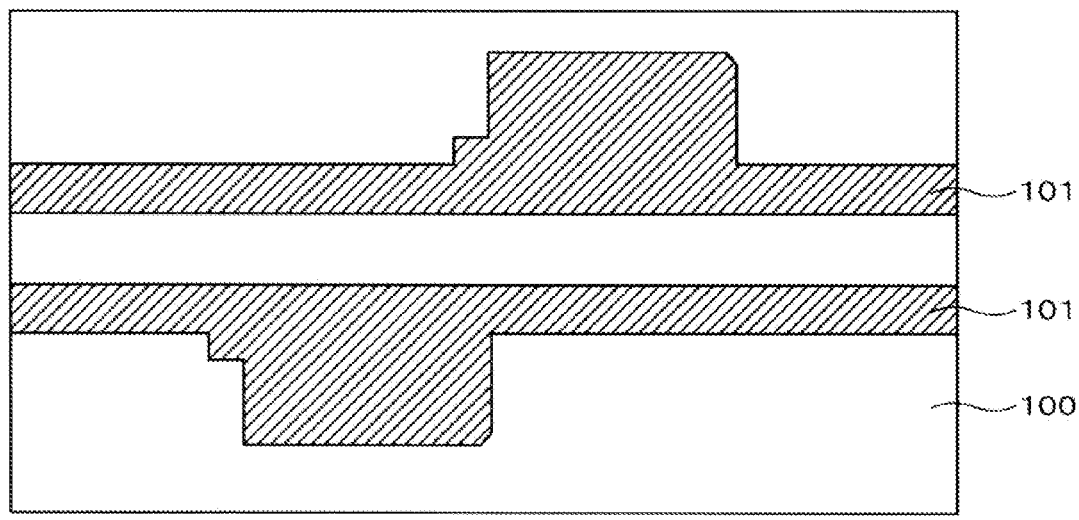
FIG. 4A is a plan view which shows a manufacturing process (gate electrode formation) of a liquid crystal display device examined by the inventors.
Figure 4B:
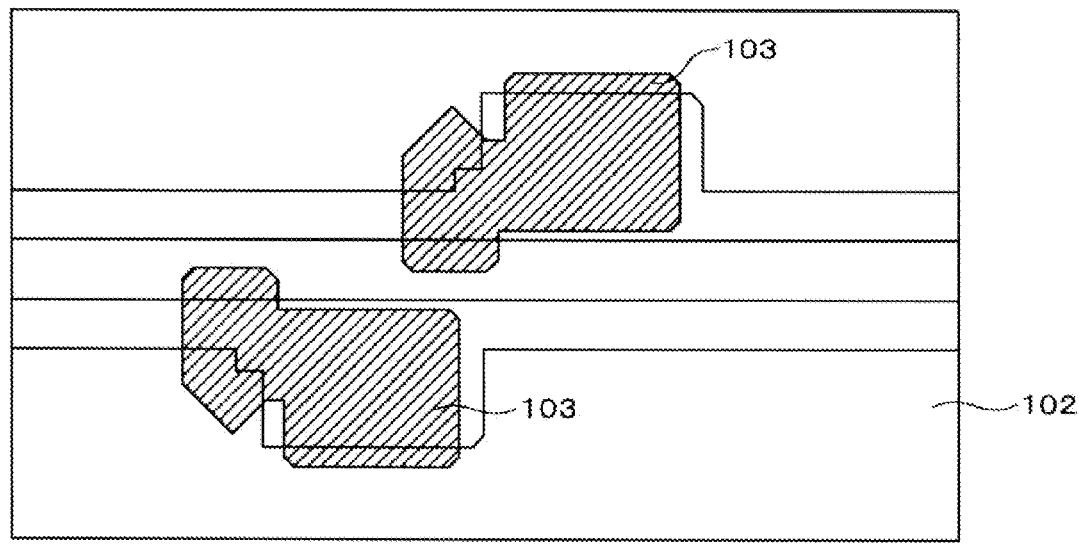
FIG. 4B is a plan view which shows a manufacturing process (semiconductor layer formation) of a liquid crystal display device examined by the inventors.
Figure 4C:
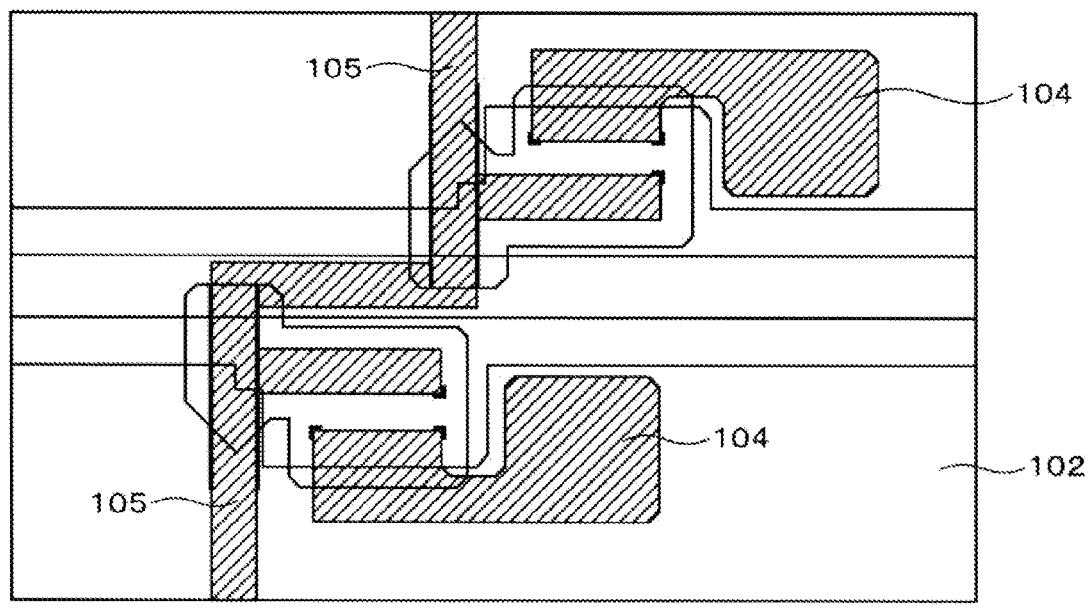
FIG. 4C is a plan view which shows a manufacturing process (source-drain electrode formation) of a liquid crystal display device examined by the inventors.
Figure 4D:
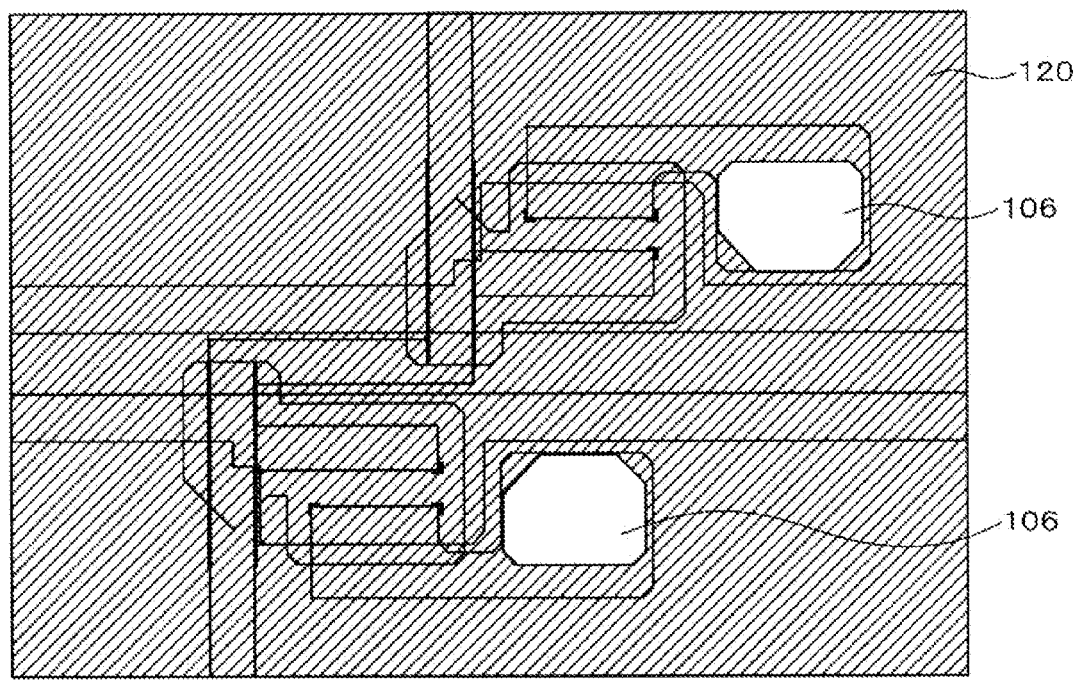
FIG. 4D is a plan view which shows a manufacturing process (organic passivation film formation) of a liquid crystal display device examined by the inventors.
Figure 4E:
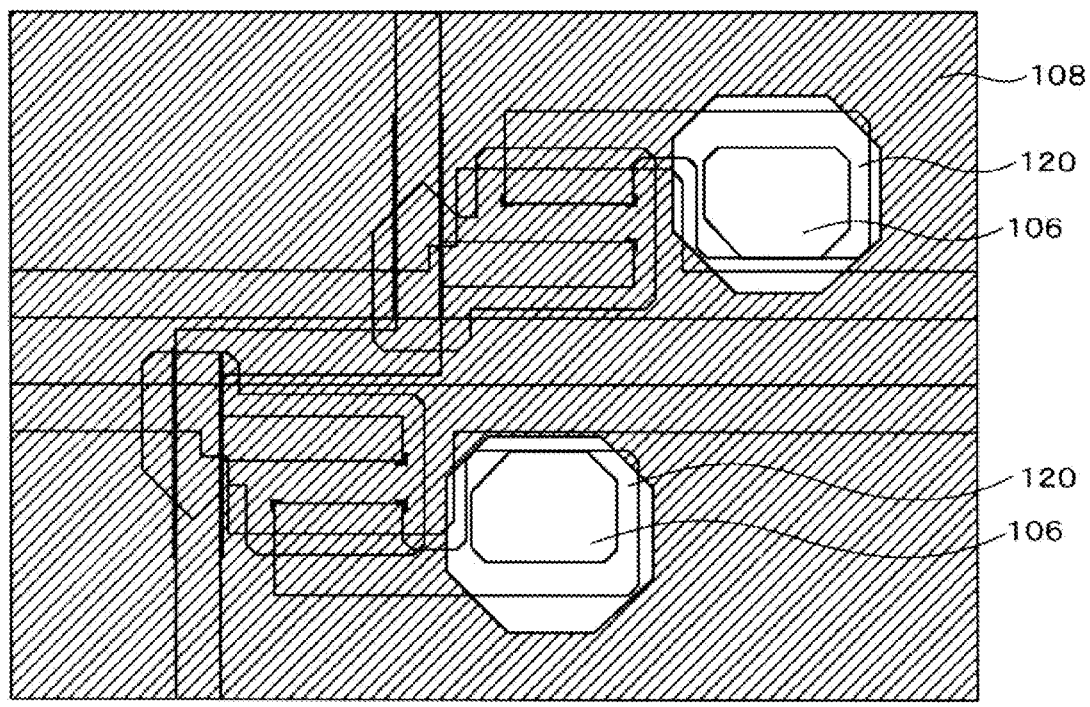
FIG. 4E is a plan view which shows a manufacturing process (MIT formation) of a liquid crystal display device examined by the inventors.
Figure 4F:
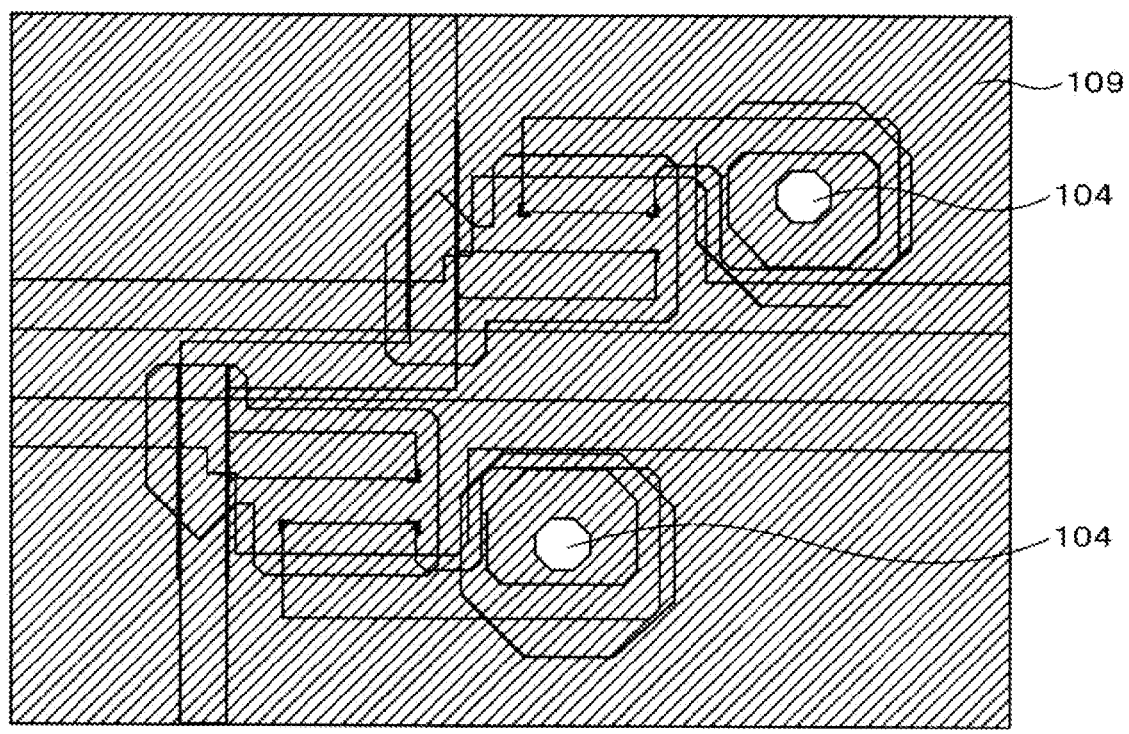
FIG. 4F is a plan view which shows a manufacturing process (upper inorganic passivation film formation) of a liquid crystal display device examined by the inventors.
Figure 4G:
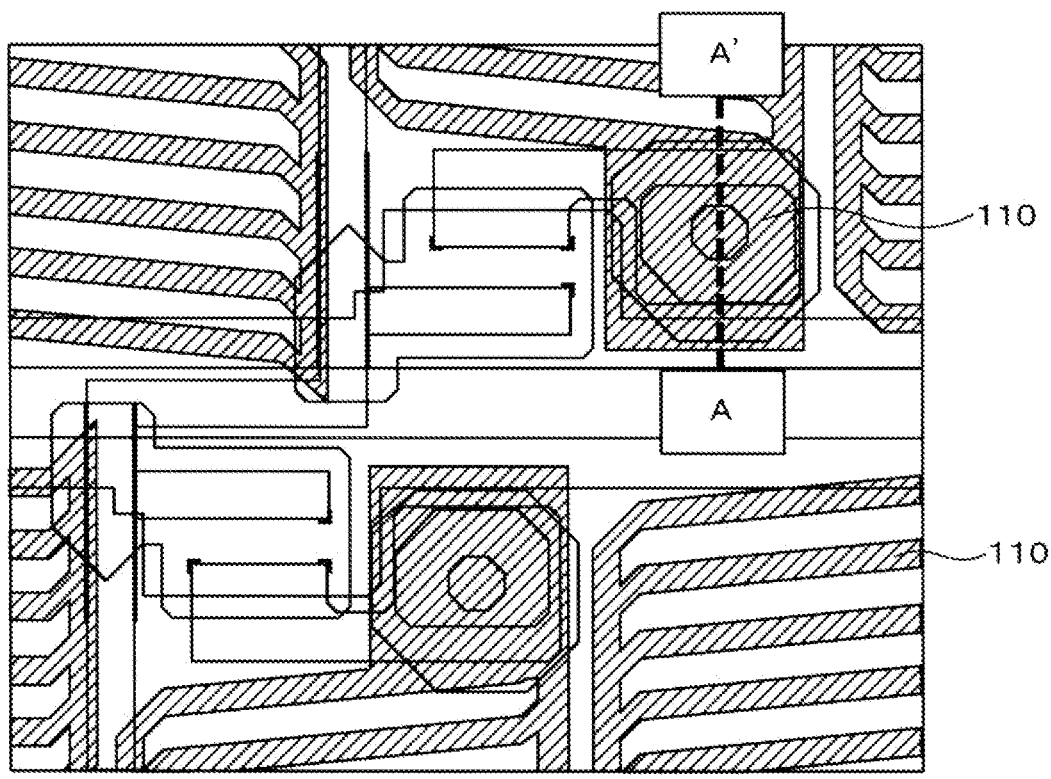
FIG. 4G is a plan view which shows a manufacturing process (ITO formation) of a liquid crystal display device examined by the inventors.

The inventors of the present invention reviewed the manufacturing process to examine a cause of display irregularity. FIGS. 4A to 4G are plan views which show manufacturing processes of a liquid crystal display device (in particular, pixel portions including FET) examined by the inventors. First, a scanning line and gate electrode 101 were formed on a TFT substrate 100 (FIG. 4A). Subsequently, a gate insulating film 102 was formed on the entire surface thereof, and then a semiconductor layer 103 constituting a channel portion of the TFT was formed in a position corresponding to that of the gate electrode (FIG. 4B). Successively, a source electrode 104 and a video signal line and drain electrode 105 were formed on the semiconductor layer 103 across the channel portion (FIG. 4C). Subsequently, an inorganic passivation film 106 was formed on the entire surface of the multilayer film, and then an organic passivation film 120 having an asymmetrical (herein, home plate shape) opening portion was formed above the source electrode (FIG. 4D). Successively, a common electrode (MIT) 108 having opening portions which are a size larger than the home plate-shaped opening portions in the organic passivation film and thus contain the home plate-shaped opening portions was formed (FIG. 4E). Each opening portion was formed by lithography and etching. Subsequently, an upper inorganic passivation film (UPS) 109 was formed on the entire surface of the multilayer film, and then through holes through which the source electrode 104 is exposed were formed in a multilayer film including the inorganic passivation film 106 and upper inorganic passivation film 109 (FIG. 4F). Thereafter, pixel electrodes 110 which are connected to the source electrodes 104 via the through holes provided in the multilayer film including the inorganic passivation film 106 and upper inorganic passivation film 109 were formed.

Failure analysis of the liquid crystal display device manufactured was conducted through such steps. As a result, it was found that the positions of the through holes provided in the multilayer film including the inorganic passivation film 106 and upper inorganic passivation film 109 were relatively shifted from the positions of the home plate-shaped openings provided in the organic passivation film 120. For example, in FIG. 4F, when the through holes formed by lithography and etching are shifted upwardly relative to the upper home plate-shaped opening portion in the drawing, the lower through hole in the drawing is also shifted upwardly, and therefore it is shifted downwardly relative to the lower home plate-shaped opening portion (vertically inverted relative to the upper home plate-shaped opening portion in the drawing) in the drawing. Similarly, when the through holes is shifted to the right relative to the upper home plate-shaped opening portion in the drawing, the lower through hole in the drawing is shifted to the left relative to the lower'home plate-shaped opening portion (since it is vertically inverted relative to the upper home plate-shaped opening portion in the drawing) in the drawing. They also found out that the variation of the positions of the through holes in the home plate-shaped opening portions is a major cause of the display irregularity. The present invention was made in view of the above findings.

In order to suppress the variation in relative positional shift of the through holes in the home plate-shaped opening portions, in the present invention, the orientations of the home plate-shaped opening portions which have been vertically inverted in the adjacent home plate-shaped opening portions along a drain line 105 were matched. Accordingly, if any misalignment occurs in the lithography step, variation in the relative positions of the through holes in the home plate-shaped opening portions can be suppressed, and display irregularity can be suppressed. That is, in the above-mentioned liquid crystal display device, pixels disposed vertically via the scanning line are arranged symmetrically with respect to the scanning line. This results from simplification of the formation operation of the mask by inverting the pixels disposed above and below the scanning line about the scanning line in forming a mask. The inventors of the present invention address the problem stated above by causing a mask for forming opening portions in the organic passivation film to be asymmetrical, unlike the mask for forming the TFT which are symmetrical with respect to the scanning line and the mask for forming pixel electrodes.

The present invention will be described below with reference to an embodiment.

[First Embodiment]

A first embodiment of the present invention will be described with reference to FIGS. 1A to 1G, 2 and 3.

Figure 3:
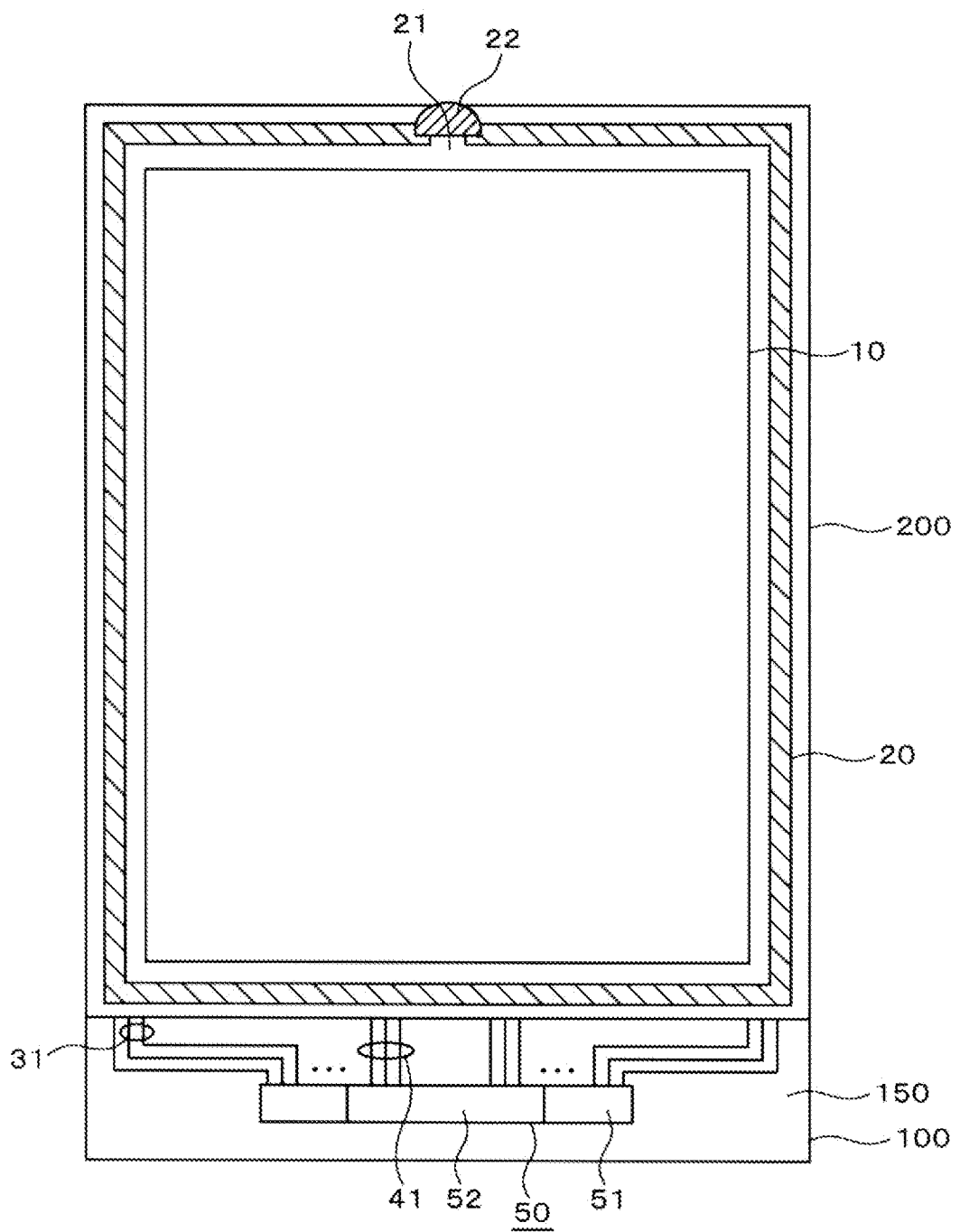
FIG. 3 is a plan view which shows a schematic overall constitution of a liquid crystal display device according to the present invention.

First, the overall constitution of the liquid crystal display device will be described with reference to FIG. 3. FIG. 3 is a plan view of a liquid crystal display device used for a device such as a cellular phone. In FIG. 3, a counter substrate 200 is placed on a TFT substrate 100. A liquid crystal layer is placed between the TFT substrate 100 and counter substrate 200. The TFT substrate 100 and counter substrate 200 are adhered by a seal 20 formed in a frame portion.

A portion where no seal is formed on the opposite side of a terminal portion 150 in FIG. 3 becomes a charging hole 21 for liquid crystals, and liquid crystals are charged from this portion. After liquid crystals are charged, the charging hole 21 is sealed by a sealing material 22. The TFT substrate 100 is formed to be larger than the counter substrate 200. In a portion where the TFT substrate 100 is larger than the counter substrate 200, a terminal portion 150 for providing power, video signal, scanning signal and others to the liquid crystal display device is formed.

In the terminal portion 150, an IC driver 50 for driving scanning lines, video signal lines and the like are placed. The IC driver 50 is divided into three areas, and a video signal drive circuit 52 is placed in the central area, while a scanning signal drive circuit 51 is placed in both side areas.

In a display area 10 in FIG. 3, scanning lines (not shown) extend in the horizontal direction, and are arranged in the vertical direction. In addition, video signal lines (not shown) extend in the vertical direction, and are arranged in the horizontal direction. The scanning lines are connected to scanning signal drive circuits 51 of the IC driver 50 by scanning line leader lines 31. In FIG. 3, in order to dispose the display area 10 at the center of the liquid crystal display device, the scanning line leader lines 31 are disposed on both sides of the display area 10, and therefore, the scanning signal drive circuits 51 are placed on both sides of the IC driver 50. In contrast, the video signal line leader lines 41 which connect the video signal lines with the IC driver 50 are gathered on the lower side of the screen. The video signal line leader lines 41 connect with the video signal drive circuit 52 disposed at the center of the IC driver 50.

Second, a manufacturing process of the liquid crystal display device according to this embodiment (especially the pixel portion including an FET) will be described with reference to FIGS. 1A to 1G and 2. FIGS. 1A to 1G are plan views which show a manufacturing process of the liquid crystal display device according to this embodiment (especially the pixel portions including an FET), while FIG. 2 is a cross-sectional view taken along line AA' in FIG. 1G, while FIG. 3 is a schematic overall plan view of the liquid crystal display device. In the liquid crystal display device according to this embodiment, pixels are disposed in a delta arrangement, and a single drain signal line is provided for two gate signal lines.

Figure 1A:
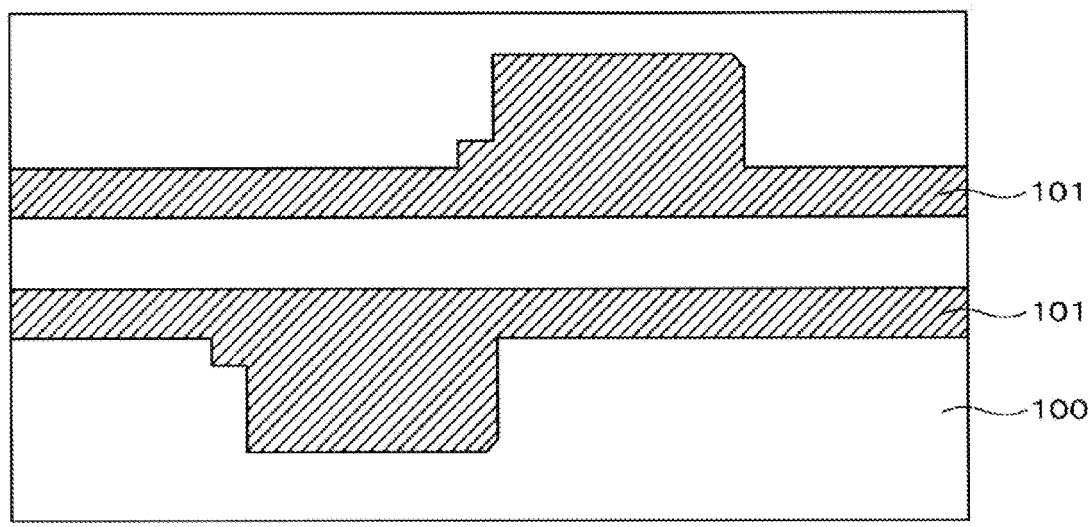
FIG. 1A is a plan view which shows a manufacturing process (gate electrode formation) of a liquid crystal display device according to a first embodiment of the present invention.
Figure 2:
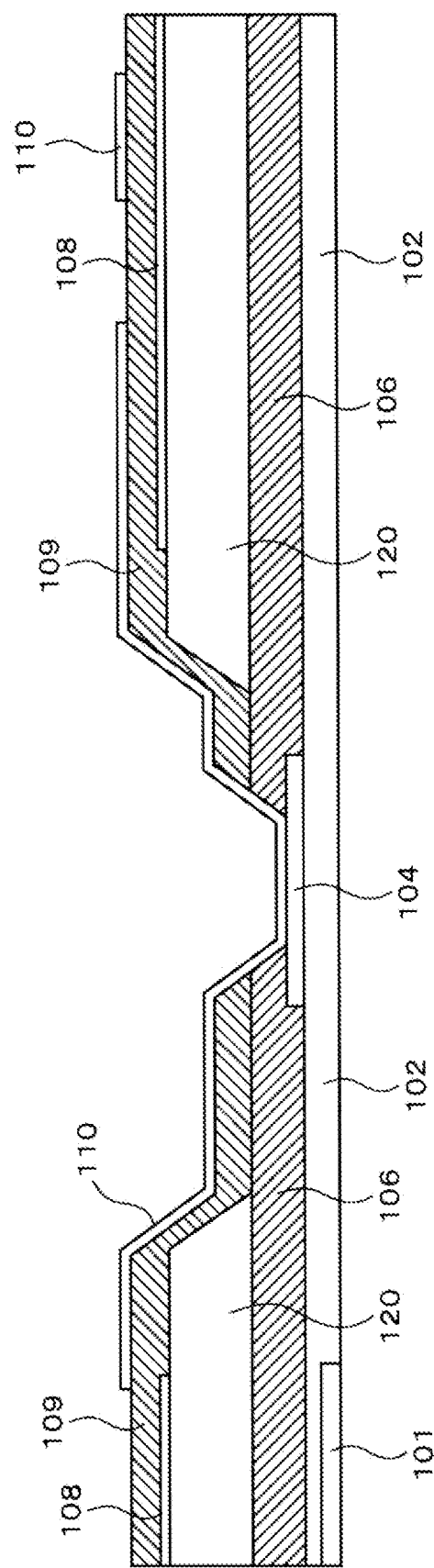
FIG. 2 is a cross-sectional view taken along line AA' in FIG. 1G.

First, the gate electrodes 101 are formed on the TFT substrate 100 made of glass (FIG. 1A, FIG. 2). The gate electrodes 101 are formed on the same layer as the scanning lines. They are collectively denoted by the numeral 101 in the drawing. The gate electrodes 101 used are Mo alloy laminated on an Al alloy, but are not limited to this.

Figure 1B:
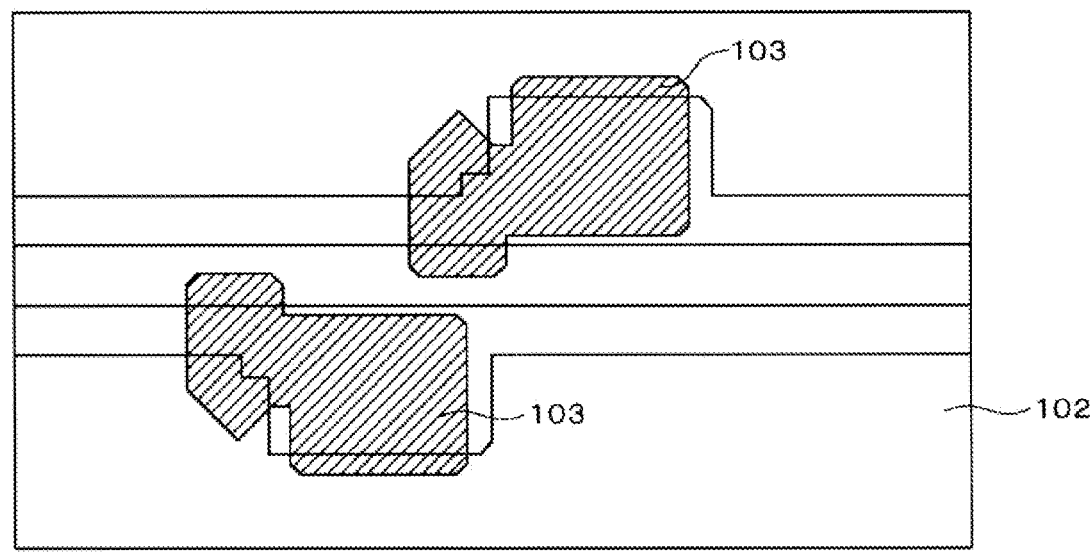
FIG. 1B is a plan view which shows a manufacturing process (semiconductor layer formation) of a liquid crystal display device according to the first embodiment of the present invention.
Figure 1C:
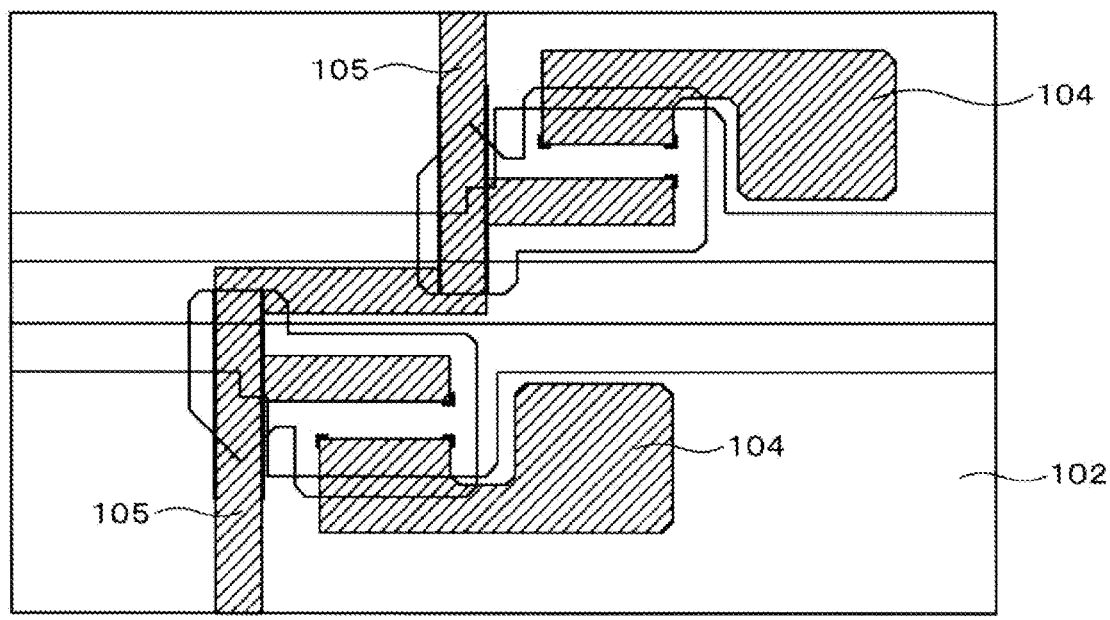
FIG. 1C is a plan view which shows a manufacturing process (source-drain electrode formation) of a liquid crystal display device according to the first embodiment of the present invention.

Next, an insulation film 102 was formed of SiN. Portions of this insulation film which cover the gate electrodes 101 become gate insulating films (FIG. 2). They are collectively denoted by the numeral 102 in the drawing. Thereafter, a semiconductor layer 103 was formed in a position opposing the gate electrodes 101 via the gate insulating films 102 (FIG. 1B). In this embodiment, a-Si film was formed by the plasma CVD as the semiconductor layer 103. This semiconductor layer 103 constitutes a channel portion of the TFT. Source electrodes 104 and a drain electrode 105 were formed on the semiconductor layer 103 across the channel portion (FIG. 1C, FIG. 2). It should be noted that an n+Si layer (not shown) is formed between the semiconductor layer 103 and drain electrodes 105 or source electrodes 104. This is to provide an ohmic contact between the semiconductor layer 103 and source electrodes 104 or drain electrodes 105. It should be noted that in FIGS. 1A and 1B, the gate electrodes and semiconductor layer in upper and lower parts are shifted horizontally, which is because pixels are disposed in a delta arrangement.

The drain electrodes 105 are also used as video signal lines, and are bent between pixels disposed in a delta arrangement. They are collectively denoted by the numeral 105 in the drawing. The source electrodes 104 and drain electrodes 105 are both simultaneously formed on the same layer. In this embodiment, the source electrodes 104 or drain electrodes 105 were formed of an Mo alloy. When the electric resistance of the source electrodes 104 or drain electrodes 105 is to be lowered, for example, such an electrode structure that Al alloy is sandwiched between Mo alloy may be used.

Figure 1D:
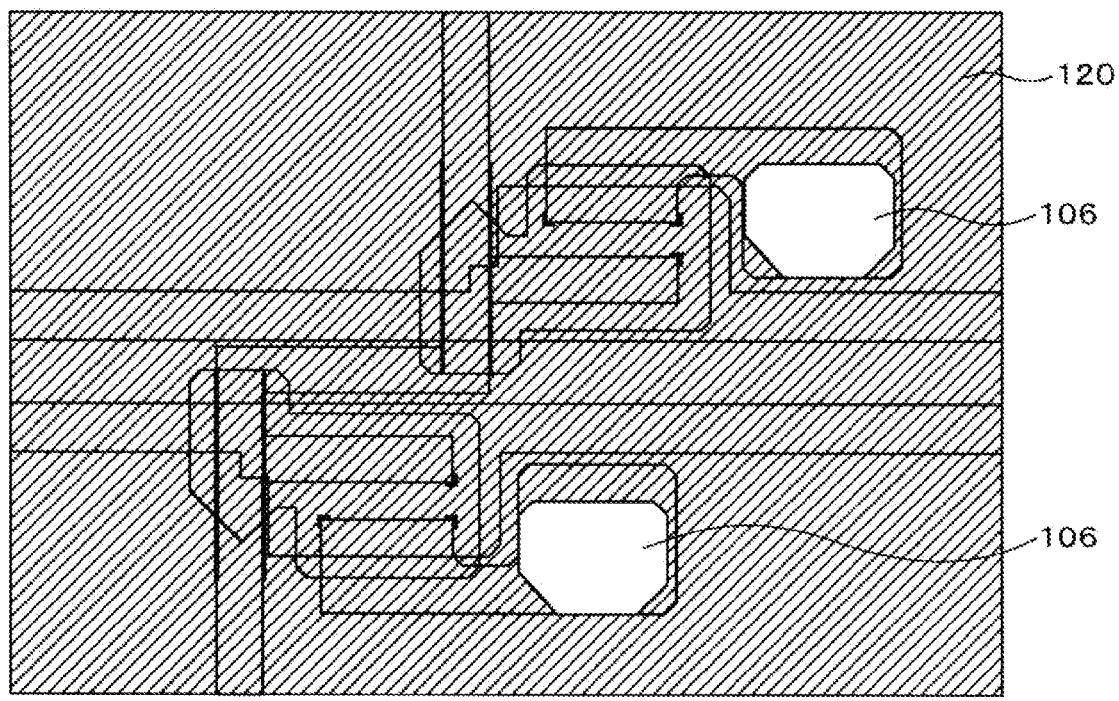
FIG. 1D a plan view which shows a manufacturing process (organic passivation film formation) of a liquid crystal display device according to the first embodiment of the present invention.

Subsequently, an inorganic passivation film 106 was formed of SiN by covering the TFT (FIG. 2). The inorganic passivation film 106 protects in particular a channel portion of the TFT from impurities. An organic passivation film 120 having asymmetrical (herein, home plate-shaped) opening portions was formed above the source electrodes 104 via the inorganic passivation film 106 (FIG. 1D, FIG. 2). At that time, the home plate-shaped openings adjacent along the drain electrodes 105 were disposed so that the orientations of the same were not inverted from each other but were the same. That is, the home plate-shaped openings were disposed to be asymmetrical with respect to the scanning lines. It should be noted that the inorganic passivation film 106 is exposed at the home plate-shaped opening portions.

Figure 1E:
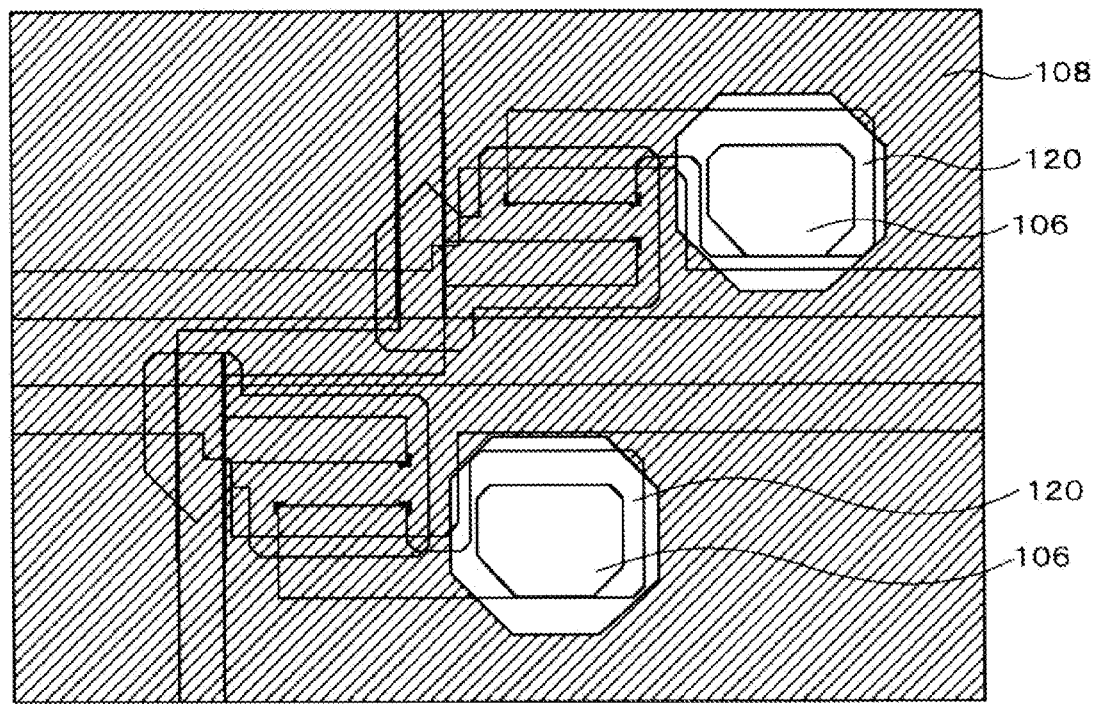
FIG. 1E is a plan view which shows a manufacturing process (MIT formation) of a liquid crystal display device according to the first embodiment of the present invention.

Next, a common electrode (MIT) 108 having opening portions which are a size larger than the home-plate shaped opening portions and thus contain the home plate-shaped opening portions was formed on a multilayer film including the inorganic passivation film 106 and organic passivation film 120 (FIG. 1E, FIG. 2). The common electrode (MIT) 108 was formed by sputtering ITO (Indium Tin Oxide) over the entire display area 10 which is a transparent conductive film. That is, the common electrode (MIT) 108 is formed in the form of a surface. After the common electrode (MIT) 108 was formed by sputtering throughout the display area, opening portions which are a size larger than the home plate-shaped opening portions and thus contain, the home plate-shaped opening portions were formed by etching. The inorganic passivation film 106 is exposed at the center of each of these opening portions, while the organic passivation film is exposed in the surroundings thereof.

Figure 1F:
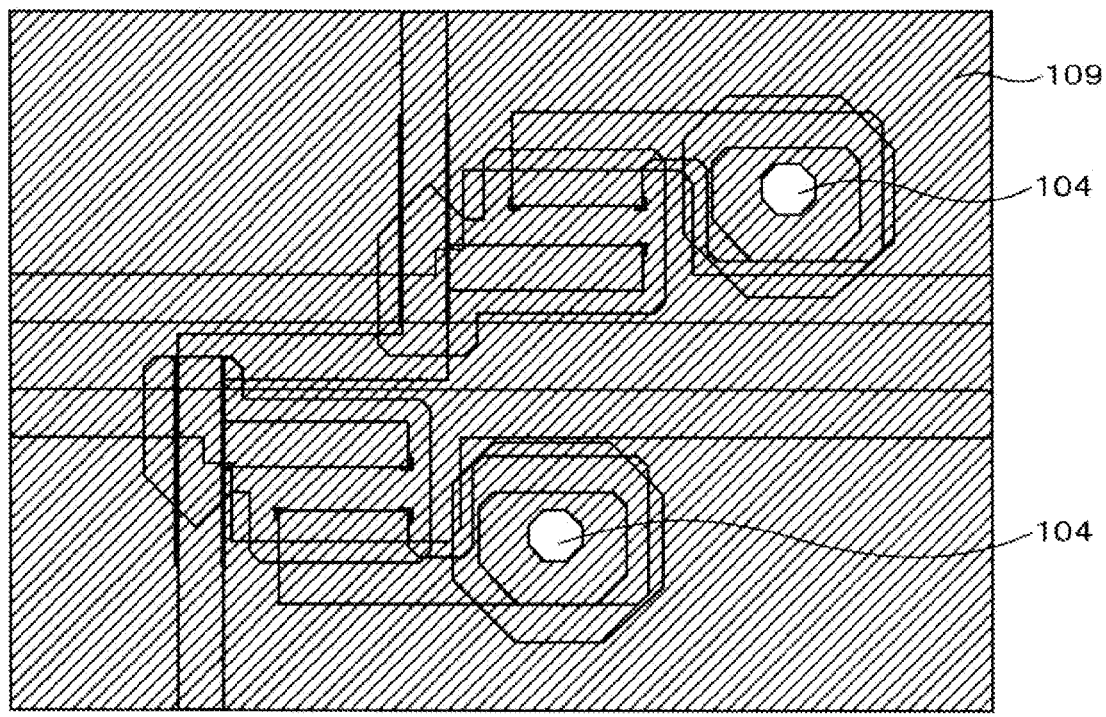
FIG. 1F is a plan view which shows a manufacturing process (upper inorganic passivation film formation) of a liquid crystal display device according to the first embodiment of the present invention.

Next, the common electrode (MIT) 108, organic passivation film 120, inorganic passivation film and other components were covered with SiN to form an upper inorganic passivation film 109. Successively, by etching, through holes were formed in the multilayer film including the inorganic passivation film 106 and upper inorganic passivation film 109 inside the home plate-shaped opening portions (FIG. 1F, FIG. 2). The source electrode 104 is exposed in this through holes.

Figure 1G:
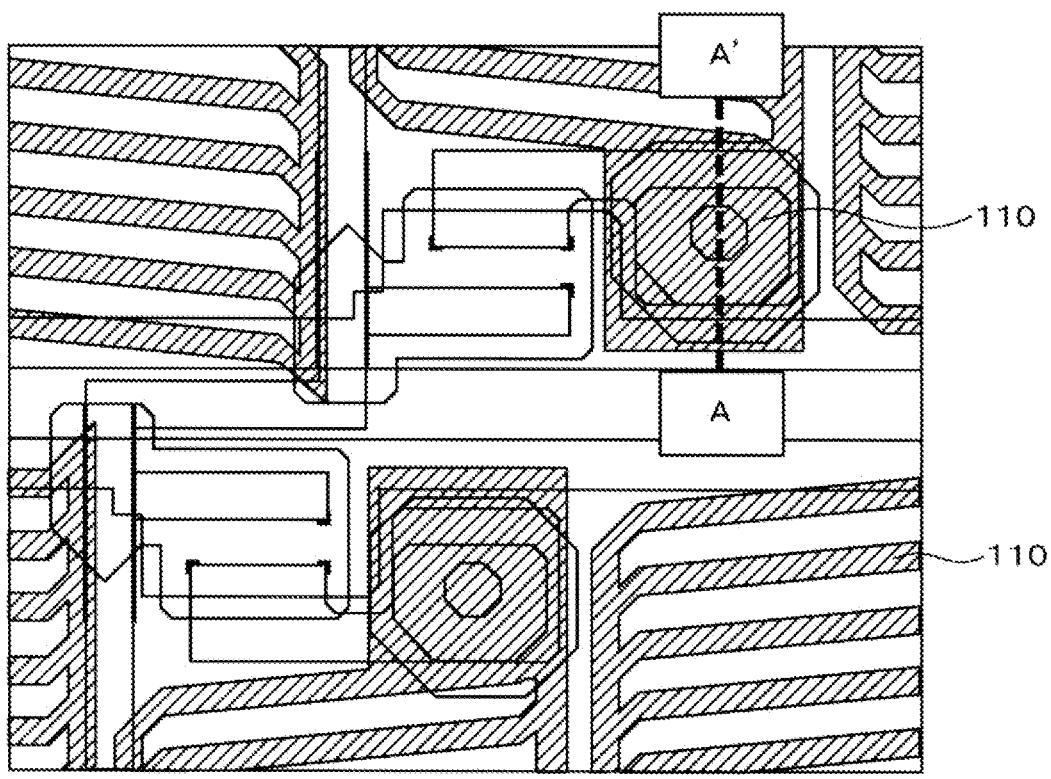
FIG. 1G is a plan view which shows a manufacturing process (ITO formation) of a liquid crystal display device according to the first embodiment of the present invention.

Thereafter, the upper inorganic passivation film 109 and through holes were covered with ITO by sputtering to form pixel electrodes 110, and the sputtered ITO was patterned to form the pixel electrodes 110 (FIG. 1G, FIG. 2). The pixel electrode 110 has a comblike electrode structure, a common voltage is applied to the common electrode (MIT) 108, while a voltage caused by a video signal is applied to the pixel electrodes 110. When a voltage is applied to the pixel electrodes 110, a line of electric force occurs to rotate liquid crystal molecules in the direction of the line of electric force and control the transmission of light from a backlight (not shown). Since transmission from the backlight is controlled for each pixel, an image is formed. It should be noted that oriented films for orientating liquid crystal molecules are formed on the pixel electrodes 110 (not shown).

It should be noted that source contact portions for a single pixel can be disposed in four portions: upper right end, upper left end, lower right end, and lower left end of the pixel correspondingly to the location of the TFT. However, when pixels are positioned in a delta arrangement, the locations of the source contact portions in the pixel are only the combination of the lower right end and upper right end of a pixel for adjacent pixels along the drain signal line, that is, the locations shown in FIGS. 1A to 1G, and the combination of the lower left end and upper left end, that is, the locations shown in FIGS. 1A to 1G inverted with respect to the drain signal lines, and both the upper end and lower end are locations only the further end from the drain signal lines.

The display irregularity of the liquid crystal display device manufactured through the above-mentioned steps was evaluated. As a result, the line capacity between the common line and drain line was increased by laminating inorganic passivation film and organic passivation film, whereby waveform distortion was suppressed. By causing the source contact design margin to be the two-side contact design, the shape of the opening portions in the organic passivation film to be a home plate shape, and disposing the home plate-shaped opening portions adjacent along the drain signal lines so as to match the orientations of the home plate-shaped opening portions, an excellent image having no display irregularity could be obtained without sacrificing transmission coefficient.

As mentioned above, according to this embodiment, waveform distortion and lowered transmission coefficient of pixels can be suppressed in a liquid crystal display device having pixels arranged in a delta arrangement, and a liquid crystal display device with suppressed display irregularity can be provided.

It should be noted that the present invention is not limited to the above-mentioned embodiment, but includes numerous variants.

For example, in the above embodiment, from the TFT substrate side, the organic passivation film, flat common electrode, upper inorganic passivation film, and comblike pixel electrode are laminated in the order stated, but a structure where the flat pixel electrodes, upper inorganic passivation film, and comblike common electrodes are laminated in the order stated on the organic passivation film may be provided. Of course, the pixel electrodes and the common electrodes may be both in comblike shapes. In addition, although the present invention is described in the context of a so-called bottom gate structure where the gate electrodes are formed on the TFT substrate side rather than on the semiconductor layer, the semiconductor may be formed of polycrystalline silicon to form top gates. In the embodiment stated above, the pixel electrodes connected to the source electrodes have been described, but the pixel electrodes can be also applied to a connection portion between the common electrode and the common signal line which provides a potential to the common electrode. In addition, the above embodiment has a two side contact design for the connection between the pixel electrodes and source electrodes, that is, a design in which connection in at least adjacent two of the four contact holes: upper, lower, left and right holes is compensated, but it is not especially limit to this embodiment. In addition, although a liquid crystal display device has been described, the present invention can be applied to other display devices than liquid crystal display devices such as those using OLEDs and MEMS's as pixels as long as the spirit of the present invention is not deviated.

The invention claimed is:

1. A display device comprising:
a display area including a plurality of pixels; and
a driver which provides a signal for indicating an image in the display area, wherein:
each of the plurality of pixels includes a common electrode, a pixel electrode and a TFT including a source electrode, a drain electrode and a gate electrode;
the common electrode and the pixel electrode are disposed on a multilayer film including an inorganic passivation film and an organic passivation film disposed above the source electrode of the TFT;
the organic passivation film has an asymmetrical opening portion above a contact portion of the source electrode;
a through hole disposed above the contact portion of the source electrode and inside the asymmetrical opening portion of the organic passivation film is provided in the multilayer film including the inorganic passivation film and the organic passivation film, wherein the source electrode and the pixel electrode are electrically connected via the through hole; and
the orientations of the asymmetrical opening portions of the organic passivation films of the pixels which are adjacent to each other and to which the drain electrode of the TFT is connected are the same.

2. The display device according to claim 1, wherein the through holes provided in the multilayer film comprising the inorganic passivation film and the organic passivation film are disposed at the further end of the pixel with respect to a drain signal line which connects the drain electrodes.

3. The display device according to claim 1, wherein
A scanning line which connects the gate electrodes of the TFT provided in the plurality of pixels is a straight line, and
a video signal line which connects the drain electrodes is bent between the pixels disposed in a delta arrangement.

4. The display device according to claim 1, wherein the asymmetrical opening portions of the organic passivation film are home plate-shaped opening portions.

5. The display device according to claim 1, wherein two scanning lines are formed between the pixels adjacent to each other.

6. The display device according to claim 5, wherein
the shape of the TFT which is present in each of the pixels adjacent to each other and the shape of the pixel electrodes are symmetrical with respect to the two scanning lines, and
the asymmetrical opening portions which are present in each of the pixels adjacent to each other are asymmetrical with respect to the two scanning lines.

* * * * *

UNITED STATES PATENT AND TRADEMARK OFFICE
CERTIFICATE OF CORRECTION

PATENT NO. : 8,552,433 B2
APPLICATION NO. : 13/490763
DATED : October 8, 2013
INVENTOR(S) : Takahiro Nagami It is certified that error appears in the above-identified patent and that said Letters Patent is hereby corrected as shown below:

In the Specification

Column 1, line 53, change "Of" to --of--;
Column 1, line 60, change "expected" to --expected to--;
Column 4, line 18, change "lower' home" to --lower home--; and In the Claims Claim 3, column 8, line 35-36, change "wherein A scanning" to --wherein a scanning--.

Signed and Sealed this
Twenty-sixth Day of November, 2013

Margaret A. Focarino
*Commissioner for Patents of the United States Patent and Trademark Office*